United States Patent [19]
Nagazumi

[11] 3,963,273
[45] June 15, 1976

[54] SEAT BELT ASSEMBLY
[75] Inventor: Yasuo Nagazumi, Tokyo, Japan
[73] Assignee: Nissan Motor Co., Ltd., Yokohama, Japan
[22] Filed: Jan. 10, 1974
[21] Appl. No.: 432,339

[30] Foreign Application Priority Data
Jan. 12, 1973  Japan.............................. 48-486852

[52] U.S. Cl................................ 297/389; 297/388
[51] Int. Cl.² ........................................ A62B 35/00
[58] Field of Search................... 297/385, 389, 388; 280/150 SB; 244/122 R, 122 B

[56] References Cited
UNITED STATES PATENTS

| | | | |
|---|---|---|---|
| 3,572,832 | 3/1971 | Graham | 297/388 |
| 3,613,819 | 10/1971 | Maloney | 297/388 |
| 3,638,999 | 2/1972 | Tischler | 297/389 |
| 3,801,156 | 2/1974 | Granig | 280/150 SB |
| 3,822,915 | 7/1974 | Colucci | 297/389 |
| 3,841,657 | 10/1974 | Ewert et al. | 297/389 |
| 3,856,351 | 12/1974 | Garvey | 280/150 SB |

Primary Examiner—James T. McCall

[57] ABSTRACT

Shoulder and lap belts are joined to each other and are fastened or unfastened simultaneously. Pivoted shaft members extend either longitudinally in the direction of a vehicle seat or diagonally with respect to said seat. One end of each lap belt is fixed to one of the pivoted shafts.

6 Claims, 3 Drawing Figures

SEAT BELT ASSEMBLY

This invention relates to a vehicle occupant restraining seat belt assembly including shoulder and lap belts.

It is commonly recognized that a seat belt, particularly of the type including shoulder and lap belts, is greatly effective to protect vehicle occupants from injuries during a sudden collision of the vehicle. However, there is an obvious drawback associated with the seat belt of this type. When the occupant intends to fasten or unfasten a conventional seat belt, he has to first manipulate one of the belts and only after this, he must handle the other belt. It takes therefore a considerable time to complete fastening or unfastening both the shoulder and the lap belts. This length of time annoys the occupant especially when he hastens to get moving or wants to do something that cannot be done with the belts buckled up, increasing the trend that seat occupants too often do not use the belts at all. Furthermore, some occupants are just plain lazy to buckle up, unnecessarily increasing the number of fatalities in collisions of vehicles in which seat belts were supplied but not fastened.

It is therefore an object of the invention to provide an improved seat belt assembly including shoulder and lap belts which are easily and promptly fastened and unfastened by a seat occupant.

Another object of the invention is to provide an improved seat belt assembly in which both shoulder and lap belts can be simultaneously fastened and unfastened.

Further objects and advantages of this invention will become readily apparent as the description proceeds with reference to the accompanying drawings, in which.

Figure 1:
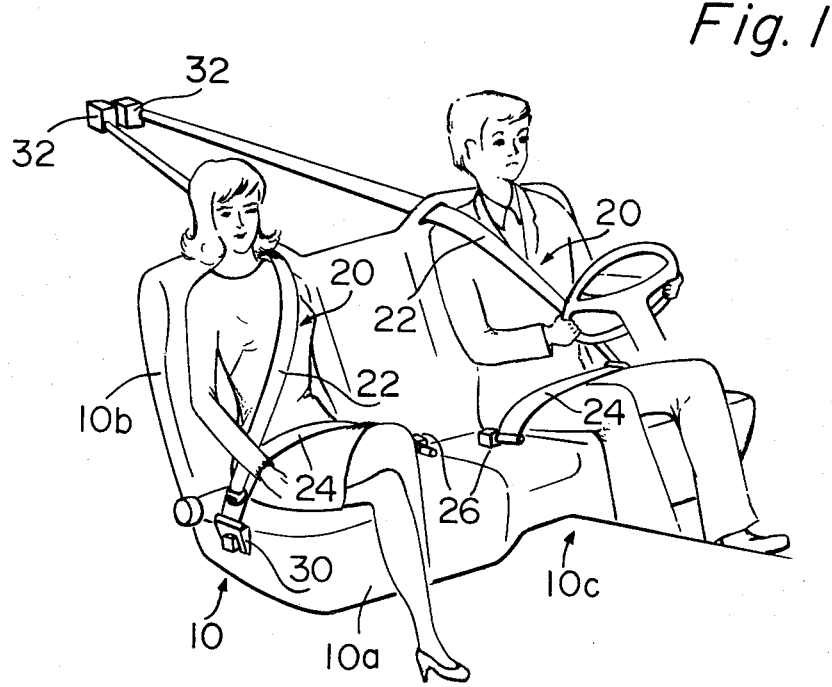
FIG. 1 is a schematic view of a safety belt assembly according to a preferred embodiment of the invention with shoulder and lap belts fastened and worn by seated occupants.
Figure 2:
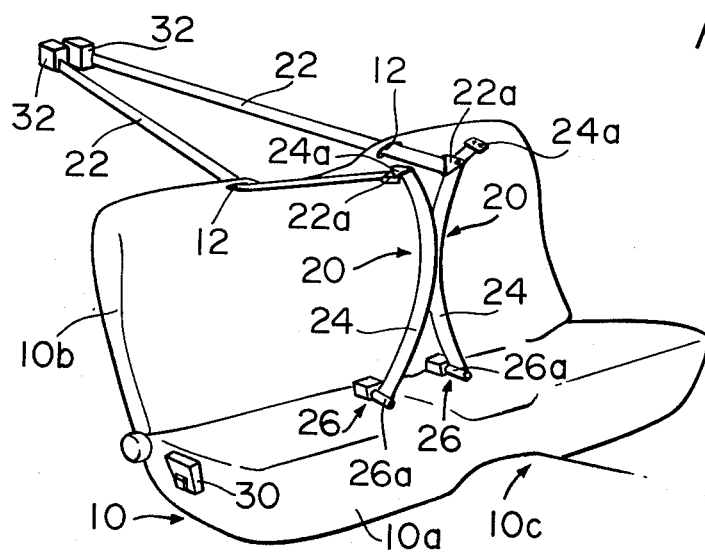
FIG. 2 is a view similar to FIG. 1 but shows shoulder and lap belts in an unfastened, released position.

As shown in FIGS. 1 and 2, a seat 10 mounted on the floor 10c of the vehicle body is provided with at least one seat belt assembly 20 which generally comprises a shoulder strap 22 and a lap strap 24. According to the invention, the lap strap 24 is made of a rather still and high tensile strength material such as plastic with limited flexibility.

There is mounted a support 26 on one side of a horizontal seat frame 10a, the support having a pivotal shaft 26a. One end of the lap strap 24 is fixed around the pivotal shaft 26a for pivotal movement of the strap 24. The support 26 accommodates biasing means such as a spring (not shown) which biases the pivotal shaft 26a to hold the lap strap 24 in its released, upright position shown in FIG. 2. The lap strap 24 is formed with an end plate 24a at its other end. The other side of the horizontal seat frame 10a is provided with locking means such as a buckle 30. When the lap strap 24 is moved to the buckle 30 overcoming the action of the spring in the support 26 and the end plate 24a is manually engaged with the buckle 30, the lap strap 24 assumes an occupant restraining position at which the strap extends across the lap of the occupant as shown in FIG. 1. The pivotal movement of the shaft 26a may be accomplished by pneumatic, hydraulic or electric control means, though not illustrated.

The shoulder strap 22 is at one end joined to the end of the lap strap adjacent the end plate 24a and extends rearward therefrom. There is formed a through hole 12 in the uppermost side of an upright seat frame 10b. The shoulder strap 22 loosely passes through the hole 12 rearward. The other, upper end of the shoulder strap 22 is connected to a conventional emergency locking retractor 32 which is fixed to any suitable portion behind the seat of the vehicle body. Thus a certain length of the shoulder strap 22 is withdrawn into the retractor 32, as long as the lap strap 24 is in the released position. As the lap strap 24 is moved to the occupant restraining position, the shoulder strap is pulled forward out of the retractor 32, the maximum length of the strap 22 being attained when the strap 24 is fastened to the buckle 30. The shoulder strap 22 passes over the shoulder and chest of the occupant into the restraining position as seen in FIG. 1. It will be thus readily understood that the lap and shoulder belts can be simultaneously moved to the occupant restraining position from the released position and vice versa acccording to the invention.

It is preferable to provide each occupant with one seat belt assembly of this invention.

Figure 3:
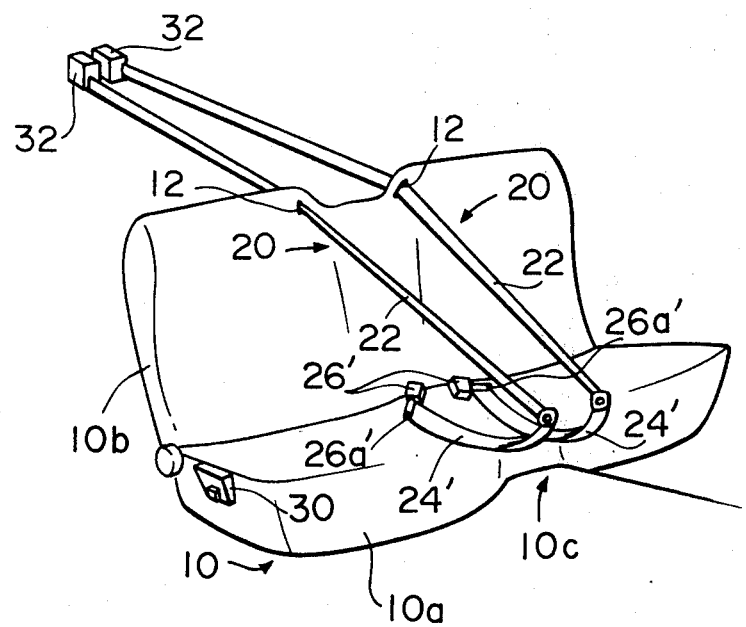
FIG. 3 is a schematic view showing another preferred embodiment of a seat belt assembly according to the invention.

Referring to FIG. 3, showing another preferred embodiment, the pivotal shaft 26a' of the support 26' is directed diagonally with respect to the longitudinal axis of the seat 10. According to this embodiment, instead of the lap strap 24 being held upright, it is held from the pivotal axis 26a' horizontally and longitudinally along the horizontal seat frame 10a in its released position. The operation of this embodiment is the same as that of the first preferred embodiment.

Although the above description purports that the support means and the locking means are manually operated by a seat occupant, it is obvious that they can be power-operated by a hydraulic or electrical actuator or the like in such a manner that the seat belt will be fastened as soon as the occupant is seated.

What is claimed is:

1. A seat belt assembly for protecting a vehicle occupant of a seat mounted on the floor of the vehicle body comprising;

a support mounted on one side of the seat and provided with a shaft extending longitudinally in the direction of the vehicle and the seat, a lap strap having one end fixed around said shaft for pivotal movement of said lap strap between an occupant restraining position and a released position, said shaft being biased for holding said lap strap upright in said released position, means engageable with the other end of said lap strap for locking the lap strap to said occupant restraining position, an emergency locking retractor fixedly mounted on said vehicle body behind the seat, and a shoulder strap having one end connected to said other end of said lap strap and the other end operably connected to said retractor.

2. A seat belt assembly as claimed in claim 1, wherein said locking means includes a buckle secured to the other side of the seat.

3. A seat belt assembly as claimed in claim 1, wherein the seat comprises an upright back portion having a through hole at its uppermost side for passing said shoulder strap therethrough.

4. A seat belt assembly for protecting a vehicle occupant of a seat mounted on the floor of the vehicle body, comprising:
- a support mounted on one side of the seat and provided with a shaft extending diagonally with respect to the seat,
- a lap strap having one end fixed around said shaft for pivotal movement of said lap strap between an occupant restraining position and a released position, said shaft being biased in one direction for holding said lap strap horizontally and longitudinally along the seat in said released position,
- means engageable with the other end of said lap strap for locking the lap strap to said occupant restraining position,
- an emergency locking retractor fixedly mounted on said vehicle body behind the seat, and
- a shoulder strap having one end connected to said other end of said lap strap and the other end operably connected to said retractor.

5. A seat belt assembly for protecting a vehicle occupant of a seat mounted on the floor of the vehicle body, comprising:
- a support mounted on an inboard side of the seat and provided with a shaft extending substantially in parallel with the longitudinal axis of the vehicle,
- a lap strap having a free end and an end fixed around said shaft for pivotal movement of the lap strap between an occupant restraining position and a released position, said shaft being biased to hold the lap strap upright away from the seat in said released position,
- said lap strap being manually movable about the shaft to said occupant restraining position against the action biasing the shaft to the released position,
- a locking means mounted on the outboard side of the seat in opposition to the support means to be engageable with the free end of the lap strap when said lap strap is moved to the occupant restraining position,
- an emergency locking retractor fixedly mounted on said vehicle body behind the seat, and
- a shoulder strap having one end connected to the free end of said lap strap and the other end operably connected to said locking retractor.

6. A seat belt assembly for protecting a vehicle occupant of a seat mounted on the floor of the vehicle body, comprising:
- a support mounted on an inboard side of the seat and provided with a shaft extending substantially diagonally with respect to the longitudinal axis of the vehicle,
- a lap strap having a free end and an end fixed around said shaft for pivotal movement of the lap strap between an occupant restraining position and a released position, said shaft being biased to hold the lap strap to be laid on the seat substantially along the longitudinal axis of the vehicle in said released position,
- said lap strap being manually movable about the shaft to said occupant restraining position against the action biasing the shaft to the released position,
- a locking means located on the outboard side of the seat in opposition to the support means to be engageable with the free end of the lap strap when said lap strap is moved to the occupant restraining position,
- an emergency locking retractor fixedly mounted on said vehicle body behind the seat, and
- a shoulder strap having one end connected to the free end of said lap strap and the other end operably connected to said locking retractor.

* * * * *